United States Patent [19]

Fukuoka et al.

[11] 4,343,479
[45] Aug. 10, 1982

[54] MECHANICAL SEALS

[75] Inventors: Tatsuhiko Fukuoka, Aichi; Akira Takenaka, Nagoya, both of Japan

[73] Assignee: Taiho Kogyo Co., Ltd., Aichi, Japan

[21] Appl. No.: 205,955

[22] Filed: Nov. 12, 1980

[30] Foreign Application Priority Data

Nov. 13, 1979 [JP] Japan .................. 54/145990

[51] Int. Cl.³ .................. F16J 15/34
[52] U.S. Cl. .................. 277/96.2; 277/DIG. 6
[58] Field of Search .................. 277/96 R, 96.2, 81 R, 277/DIG. 6; 417/269

[56] References Cited

U.S. PATENT DOCUMENTS

| | | | |
|---|---|---|---|
| 2,440,394 | 4/1948 | Cockerill | 277/96.2 |
| 3,101,200 | 8/1963 | Tracy | 277/96.2 |
| 3,588,128 | 6/1971 | Peterson | 277/96.2 |
| 3,601,413 | 8/1971 | Darnell | 277/96.2 |
| 4,205,858 | 6/1980 | Shimpzaki et al. | 277/96.2 |

FOREIGN PATENT DOCUMENTS 237470 7/1960 Australia .................. 277/96.2

*Primary Examiner*—Robert I. Smith
*Attorney, Agent, or Firm*—Burgess, Ryan and Wayne

[57] ABSTRACT

A mechanical seal mounted in a compressor comprises a rotating sealing ring, a stationary mating ring and means for pressing the sealing ring against the mating ring. The mating ring is of hardened bearing steel.

2 Claims, 4 Drawing Figures

MECHANICAL SEALS

BACKGROUND OF THE INVENTION

1. Field of the Invention

The present invention relates to mechanical seals, and, more specifically, to mechanical seals mounted in compressors, e.g. swash-plate type compressors used in air-conditioners for automobiles.

2. Description of the Prior Art

Mechanical seals are widely used to prevent the flow of liquids or gases in moving parts of machine elements (see, Packing Committee: MECHANICAL SEALS AND PACKINGS, Tool Engineers Handbook (Second Edition), McGraw-Hill, 1959, 97-1-97-7). For example, a mechanical seal is mounted in a swash-plate type compressor disclosed in U.S. Pat. No. 3,999,893.

Generally, a mechanical seal comprises (1) a sealing ring set onto a rotating shaft and rotating, (2) a stationary mating ring which has a fine-finished surface coming into contact with the sealing ring and (3) means for pressing the sealing ring against the mating ring. The rotating surface of the sealing ring comes into contact with the stationary surface of the mating ring at right angles to the shaft to form a sealing face. The sealing ring is, usually, of sintered carbon-graphite, resin-bonded carbon-graphite, resin-impregnated carbon-graphite or ceramic and the mating ring is of cast iron, stainless steel, stellite-faced stainless steel, ceramic or hard chromium-plated steel.

In a case where a mechanical seal is mounted in a swash-plate type compressor of an air-conditioner for an automobile, the operational conditions of the mechanical seal become considerably more severe. Namely, since the drive source of the compressor is an internal combustion engine, i.e., a gasoline engine or a diesel engine, the sealing ring of the mechanical seal fitted onto the drive shaft of the compressor is rotated at almost the same rotational speed as that of the internal combustion engine. Accordingly, the sealing ring is subjected to a rotational rate of 500 rpm when the internal combustion engine is idling, and to a rotational rate of 6000 rpm during high speed travel or rapid acceleration, so that variation of the operating speed of the mechanical seal is very large. Furthermore, since the sliding movement of the sealing ring with respect to the stationary mating ring can be performed by pressing the sealing ring against the mating ring by a spring, the sliding surfaces are constantly maintained under a boundary lubrication, namely, parts of the sliding surfaces are brought into contact with each other in a solid contact. Although the mechanical seal seals a sealing fluid of a mixture of a refrigerant gas and mist of lubricating oil within the compressor, a small amount of the lubricating oil leaks and thus, the lubrication between the sliding surfaces is unsatisfactory. However, during a period of several tens of seconds or sometimes a period of a few minutes, after the starting of the compressor, the sealing ring slides on the mating ring without the lubricating oil.

In a case where cast iron is used as a material for the stationary mating ring of the above-mentioned mechanical seal, though the surface of the ring is fine finished to decrease the surface roughness, the sealing capacity of the mechanical seal is low. In this case, graphites distributed within the cast iron are taken off to form small hollows by fine finishing. Furthermore, the hardness of the cast iron is relatively low, such as up to $H_V$ (Vickers hardness) 300, so that the wear rate of the cast iron is relatively high. As the wear increases, the surface roughness of the mating ring becomes uneven. The small hollows and the uneven roughness result in a decrease of the sealing capacity.

In a case where a ceramic is used as a material of the stationary mating ring, the mechanical seal has several disadvantages. Namely, the ceramic ring may be cracked by rapid variation of temperature (e.g. thermal impulse) generated by rapid acceleration to a high speed. High hardness and high wear-resistance of the sliding surface of the mating ring are advisable for the sealing capacity of the mechanical seal. However, it is difficult to machine the ceramic to a predetermined ring shape. Furthermore, since the ceramic material has a low heat conductivity and a high coefficient of friction, the sliding surfaces of the ceramic mating ring and the sealing ring generate heat and thus the sealing face reaches a high temperature. As a result, leakage of liquids or gases from the mechanical seal increases.

It is undesirable to use stainless steel as a material of the stationary ring of the above-mentioned mechanical seal. Since the stainless steel has a low heat conductivity, the sliding portion of the stainless mating ring is heated by frictional heat, as a result, the strain generated by thermal stress decreases the sealing capacity.

Hard chromium-plated steel has desirable properties as a material for the stationary mating ring except that the coefficient of friction between the mating ring and the carbon-graphite sealing ring increases when the mechanical seal is operated under severe conditions, i.e. at a high load without lubricating oil.

SUMMARY OF THE INVENTION

It is an object of the present invention to improve a mechanical seal so as to decrease leakage of sealing fluid remarkably as compared with a conventional mechanical seal.

It is another object of the present invention to provide a mechanical seal having a superior sealing capacity and mounted in a swash-plate type compressor of an air-conditioner for an automobile.

The above and other objects of the present invention are achieved by providing a mechanical seal in which a stationary mating ring is of hardened bearing steel.

It is preferable t use bearing steels (SUJ 1 through 5) disclosed in JIS G4805 (corresponding to AISI 51100, AISI 52100 or ASTM A485 Grade 1 through 4).

It is preferable that the surface hardness of the stationary mating ring of hardened bearing steel is in the range of $H_v$ 500 ($R_c$ 49) to $H_v$ 900 ($R_c$ 67) and that the surface finish (i.e. the surface roughness) thereof is up to 0.1 microns. It is preferable that the sealing ring is comprised of carbon-graphite, preferably, resin-bonded carton-graphite.

BRIEF DESCRIPTION OF THE DRAWINGS

The present invention is explained in detail with reference to the drawings, wherein.

DETAILED DESCRIPTION OF THE PREFERRED EMBODIMENT

Figure 1:
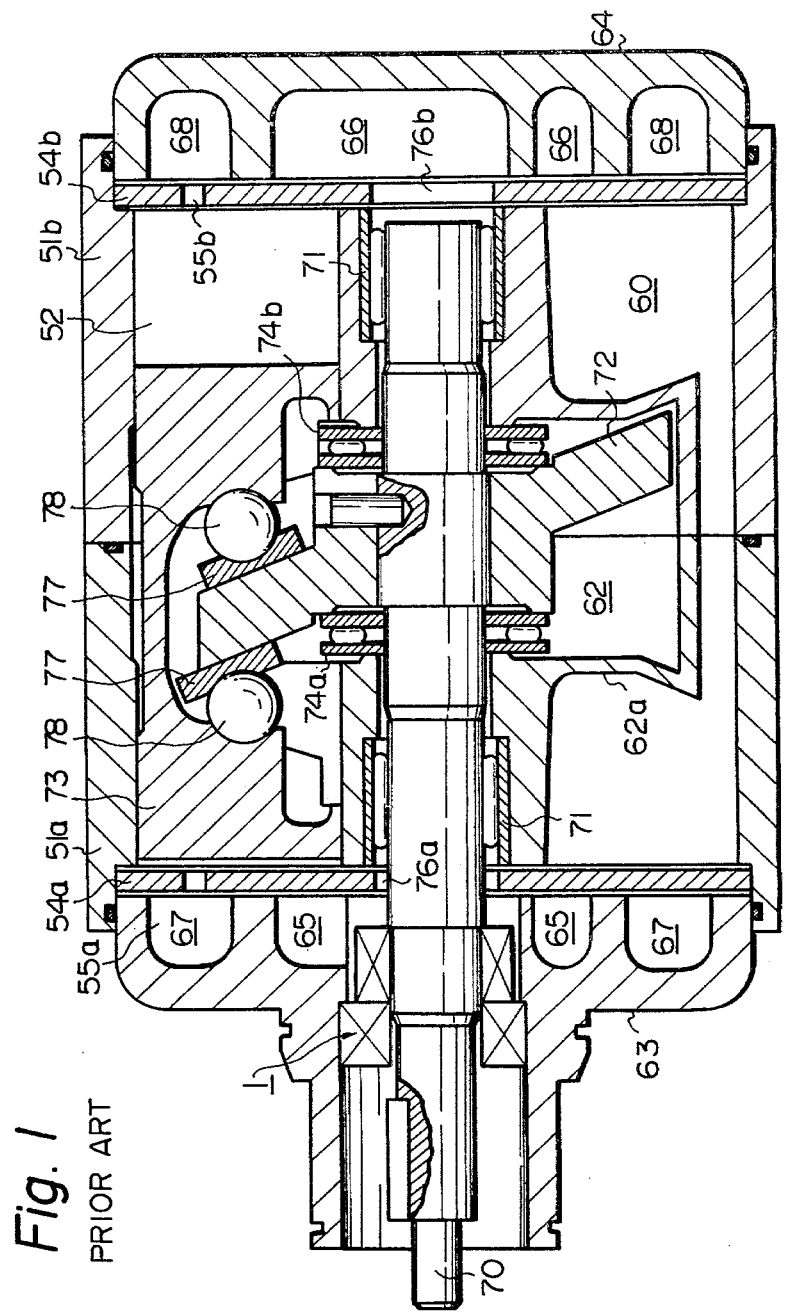
FIG. 1 is a longitudinal cross-sectional view of a swash-plate type compressor of an air-conditioner for an automobile mounted with a mechanical seal according to the present invention.
Figure 2:
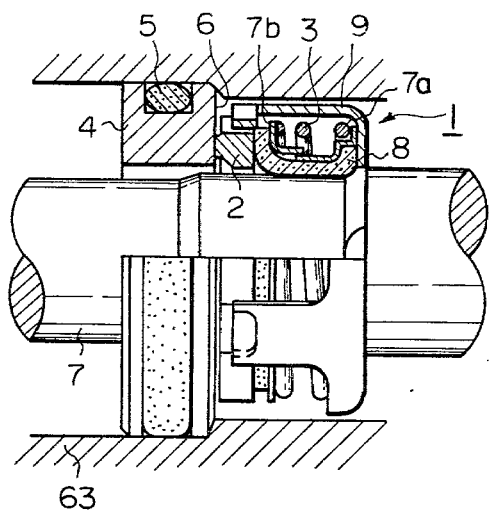
FIG. 2 is a cross-sectional view of the mechanical seal in FIG. 1.

Referring to FIG. 1, a swash-plate type compressor is mounted with a mechanical seal 1 which is illustrated in detail in FIG. 2. The compressor has a pair of cylinder blocks, i.e., a first cylinder block 51a and a rear cylinder block 51b, combined with each other in an axial alignment. The combined block formed by the pair of cylinder blocks 51a and 51b is provided with at least one, usually three, axially extending cylinder bores 52 arranged in parallel with each other. The combined block is also provided with a bottom oil reserving section 60, and a centrally arranged swash-plate chamber 62. The combined block is further accompanied by a pair of front and rear cylinder heads 63 and 64 attached to the front and rear cylinder blocks 51a and 51b, respectively, via respective valve plates 54a and 54b and appropriate gaskets. The cylinder heads 63 and 64 are provided with, in their internal spaces, suction chambers 65 and 66 and exhaust chambers 67 and 68, respectively. A drive shaft 70 coaxially passes through both cylinder blocks 51a and 51b, front cylinder head 63, and front valve plate 54a. The drive shaft 70 is rotatably supported by needle bearings 71 provided at axially outer ends of the combined block, and the drive shaft 70 is provided with a swash plate 72 secured to the middle of the drive shaft 70. The swash plate 72 is operatively connected via ball bearings 78 and shoes 77 with double acting multi-pistons 73 which are slidably fitted in the cylinder bores 52 arranged in parallel with the drive shaft 70. Therefore, when the swash plate 72 is rotated by the drive shaft 70, the pistons 73 reciprocate in the cylinder bores 52 for effecting the compression action of the compressor. The axial loads produced by the reciprocating motions of the pistons 73 are borne by a pair of thrust bearings 74a and 74b arranged between both end faces of the boss of the swash plate 72 and respective cylinder blocks 51a and 51b. The partition walls 62a of the swash plate chamber 62 are provided with through-holes (not shown) for permitting a part of the oil particles suspended in the refrigerant gas to flow between the swash plate chamber 62 and the oil reserving section 60. A refrigerant gas containing lubricating oil particles is collected in the discharge sections (not shown) of the cylinder blocks 51a and 51b from the exhaust chambers 67, 68 of both cylinder heads 63 and 64, so as to flow into the air-conditioning system of the automobile. During the operation of the compressor, the refrigerant gas together with the oil particles suspended in the gas, return from the air-conditioning system of the automobile and rush into the suction channels (not shown) of cylinder blocks 51a and 51b. The ball bearings 78 operatively connect the swash plate 72 with the pistons 73, so that, the rotating motion of the drive shaft 70 is converted to the reciprocating motion of the pistons 73. In the bores 52, the reciprocating motion compresses the refrigerant gas which is mixed with oil so as to be circulated in a refrigeration circuit and returned to the compressor, and thereafter transfers the refrigerant gas to the condensor (not shown). The refrigerant gas is cooled in the condenser to be liquefied, and then transferred to the evaporator, thereby the liquefied refrigerant gas is vaporized and the latent heat of vaporization is thus removed from the vicinity of the evaporator. The air in the drivers room is therefore cooled, while the heat withdrawn from the air is emitted to an ambient air during the conduction of the refrigerant gas through the condenser mentioned above. The lubricating oil particles together with the refrigerant gas flow into the needle bearings 71 through bores 76a and 76b of the valve plates 54a and 54b from the suction chambers 65 and 66 and simultaneously flow into the mechanical seal 1 from the suction chamber 65.

Figure 3:
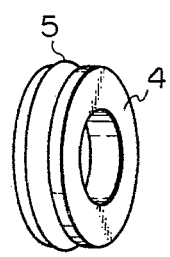
FIG. 3 is a perspective view of a stationary mating ring of the mechanical seal in FIG. 2.

The mechanical seal 1 (FIG. 2) comprises a sealing ring 2, a spring 3 and a stationary mating ring 4. The mating ring 4 is of hardened bearing steel in accordance with the present invention and has a groove admitting an O-ring 5, as illustrated in FIG. 3. The mating ring 4 is secured into the front cylinder head 63 and has a lapped side surface 6. The sealing ring is of resin-bonded carbon-graphite, sintered carbon-graphite or resin-impregnated carbon-graphite and is pressed by the spring 3 to come into contact with the lapped surface 6. The sealing ring 2, the spring 3, washers 7a and 7b and a packing 8 are set in a retainer 9. Since the retainer 9 is attached to the drive shaft 70, the sealing ring 3 rotates together with the drive shaft 70. Therefore, the rotating sealing ring 2 slides on the stationary lapped surface 6 of the mating ring 4. The sliding surfaces of the sealing ring 2 and mating ring 4 form a sealing face to prevent the lubricating oil and the refrigerant gas from flowing away.

The present invention is explained in detail by way of the following example.

The example was carried out under the following conditions. The mating ring 4 was made of bearing steel of SUJ2 (AISI 52100) so as to have an outside diameter of 30 mm, an inside diameter of 16.5 mm and a thickness of 8 mm. The mating ring 4 had the groove for the O-ring 5. After machining the mating ring, the mating ring was heat-treated (i.e., quenched and tempered) to attain a surface hardness of $H_v$ 820. Then the hardened mating ring was lapped or polished to form the smooth side surface 6 having a roughness of up to 0.1 microns. The sealing ring 2 was made of a resin-bonded carbon-graphite consisting of 60% graphite, 10% silicon dioxide and 30% phenol resin.

The mechanical seal 1 was assembled by using the above-mentioned mating ring 4 and the sealing ring 2, as illustrated in FIG. 2, within the front cylinder head 63 of the swash-plate type compressor (FIG. 1). During the operation of the compressor, the refrigerant gas containing lubricating oil particles and having a pressure of 15–17 kg/cm$^2$ was pumped out from the cylinder bore 52 and simultaneously the refrigerant gas having a pressure of 1–2 kg/cm$^2$ flowed into a part of the cylinder bore 52. The amount of the lubricating oil circulated together with the refrigerant gas was 180 cc. When the compressor was operated at 2000 rpm for 100 hours, the amount of leaked lubricating oil from the mechanical seal was measured. As a result of the measurement, the leakage quantity of the oil was approximately 1 mg/hr.

The present invention is explained by way of the following comparison experiment.

Figure 4:
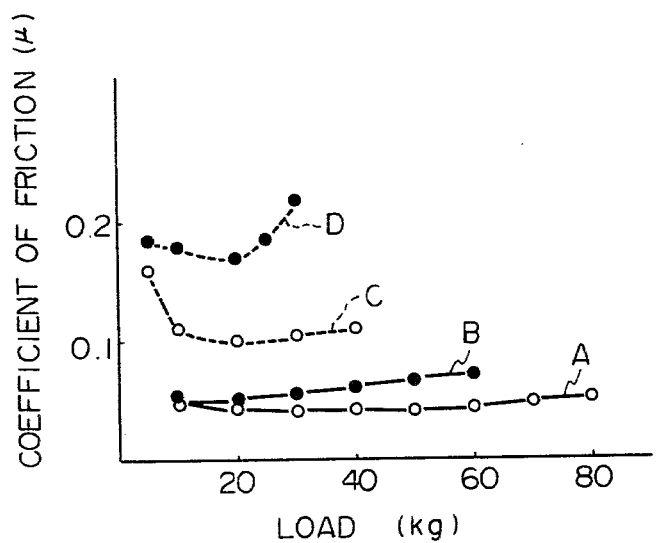
FIG. 4 is a graph showing the relationship between the coefficient of friction of the sliding surfaces and the load put on the sliding surfaces.

Sample plate A was made of bearing steel of SU 2, and heat-treated. The surface hardness of the Sample plate A was $H_v$ 820 and the surface roughness thereof was up to 0.2 microns. Sample plate B was produced by plating a rolled steel for general structure purposes of SS41 with a hard chromium layer. The hard chromium layer had a thickness of 20 microns, a hardness of $H_v$ 830 and a lapped surface roughness of up to 0.2 microns. A cylindrical carbon-graphite rod was made of a resin-bonded carbon-graphite consisting of 60% graphite, 10% silicon dioxide and 30% phenol resin. The cylindrical rod had an outside diameter of 22.4 mm and an inside diameter of 18.4 mm. In order to measure the coefficient of friction between the Sample plate and the carbon-graphite cylindrical rod, the rod was rotated at a constant speed of 2 m/sec (at a diameter of 20.4 mm) and was pressed against Sample plate A or B by a load in the range of 5 to 80 kg in oil or in air (i.e. with or without lubricating oil). The oil was a mixture of refrigerating machine oil and light oil in the ratio of 1:9. The results of the experiments carried out under the above-mentioned conditions are shown in FIG. 4. In FIG. 4, the solid lines A and B show the results of the experiments carried out in the oil, and the broken lines C and D show the results of the experiments carried out in the air, namely, without the lubricating oil. Furthermore, the results of Sample plate A of bearing steel are illustrated with the lines A and C, and the results of Sample plate B of hard chromium-plated steel are illustrated with the lines B and D. As is obvious from FIG. 4, the coefficient of friction of Sample plate A is lower than that of Sample plate B. Therefore, the hardened bearing steel is preferble to the hard chromium-plated steel for a stationary mating ring of a mechanical seal which is operated at a high load without a lubricating oil.

We claim:

1. A mechanical seal for a swash-plate type compressor of an air-conditioner for an automobile, comprising a carbon-graphite sealing ring which rotates together with a rotating shaft, a stationary mating ring of hardened bearing steel which has a lapped surface coming into contact with said sealing ring, the hardness of said lapped surface being in the range of $H_v$ 500 to $H_v$ 900, and means for pressing said sealing ring against said stationary mating ring.

2. The seal according to claim 1, wherein said mating ring has a surface smoothness of 0.1 microns or better, and said sealing ring is made of a resin-bonded carbon-graphite comprising 60% graphite, 10% silicon dioxide and 30% phenol resin.

* * * * *

UNITED STATES PATENT AND TRADEMARK OFFICE
CERTIFICATE OF CORRECTION

PATENT NO. : 4,343,479
DATED : August 10, 1982
INVENTOR(S) : Tatsuhiko Fukuoka et al.

It is certified that error appears in the above—identified patent and that said Letters Patent is hereby corrected as shown below:

Column 2, line 47: After "preferable" change "t" to --to--
line 56: "ton" should be "bon"

Column 6, line 3: "preferble" should be --preferable--

Signed and Sealed this

Thirteenth Day of September 1983

[SEAL]

Attest:

GERALD J. MOSSINGHOFF

Attesting Officer

Commissioner of Patents and Trademarks